> United States Patent Office 3,803,298
Patented Apr. 9, 1974

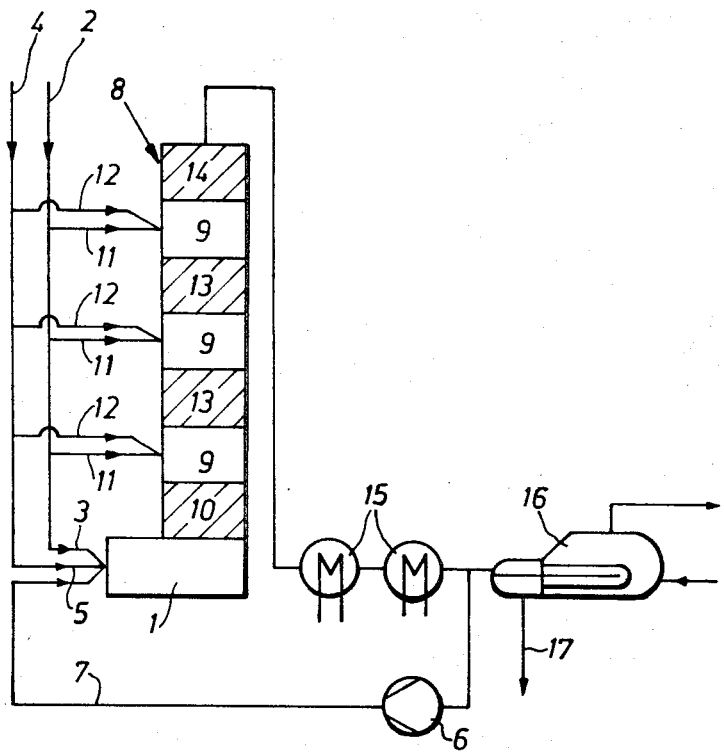

3,803,298
PROCESS FOR THE CONTINUOUS PRODUCTION OF HIGH PURITY SULFUR DIOXIDE
Hans Guth, Neukirchen, Klaus Kleine-Weischede and Peter Reher, Leverkusen, and Hermann Wieschen, Cologne, Germany, assignors to Bayer Aktiengesellschaft, Leverkusen, Germany
Filed Nov. 14, 1972, Ser. No. 306,462
Claims priority, application Germany, Dec. 2, 1971, P 21 59 790.0
Int. Cl. C01b 17/48, 17/54
U.S. Cl. 423—543
6 Claims

ABSTRACT OF THE DISCLOSURE

In the production of sulfur dioxide by the combustion of sulfur with oxygen, the sulfur is burned in multiple stages with interstage cooling. A portion of the sulfur dioxide is recycled to the first combustion stage to moderate the temperature therein.

---

This invention relates to a process for the continuous production of high purity sulfur dioxide by the combustion of sulfur with oxygen.

Numerous processes are known for the production of sulfur dioxide. In most of these sulfur ores are converted into sulfur dioxide by roasting or elementary sulfur is converted into sulfur dioxide by combustion. It is well known that roasting processes can be carried out in story furnaces, fluidized bed furnaces or in rotary kilns and combustion processes in fluidized bed furnaces or in atomization burners of various kinds.

In the combustion of sulfur, it is important to ensure as complete combustion of sulfur as possible and to control the temperature. Only under these conditions can pure sulfur dioxide be produced economically.

It is known that the escape of sulfur dust or vapors from sulfur furnaces operated with air under pressure can be prevented by providing a horizontal superheater plate which guides the gas along a given direction (German patent specification No. 1 183 703). According to another process, pulverulent sulfur is introduced into a stream of air or oxygen in such a manner that the sulfur ignites the moment it comes into contact with the oxidizing gas and undergoes instant combustion (German patent specification No. 1 915 96).

Other processes, again, are arranged so that the reactants are forced to keep to certain paths and directions of flow (German patent specifications Nos. 262 326, 367 843, 376 544, 711 536 and 944 488).

German patent specification No. 437 910 describes the combustion of sulfur with oxygen in the presence of an excess of sulfur vapor, optionally under excess pressure. The presence of excess ulfur during combustion is intended to lower the reaction temperature.

In the process described in German patent specification No. 539 640 heated oxygen or air is passed in the form of fine bubbles through hot liquid sulfur.

In another known process (German patent specification No. 968 066) an attempt is made to prevent residues of sulfur, which are frequently left in the sulfur combustion gas, by subdividing the air used for combustion into one primary and two secondary streams in a particular manner.

For processes operating at a high output, it is important that the combustion temperature is kept at a level at which oxides of nitrogen are not formed.

German Offenlegungschrift No. 1 948 754 relates to a process by which the formation of nitrogen oxides in the combustion of sulfur with oxygen-containing gases is prevented by first burning the sulfur with less than the stoichiometric quantity of oxygen and then reburning the resulting gas mixture containing sulfur dioxide and sulfur with oxygen-containing gases after they have been passed through a heat exchanger.

It is an object of the present invention to provide a process for oxidizing sulfur to sulfur dioxide which can be carried out simply, in high efficiency and substantially quantitatively with comparatively simple apparatus.

These and other advantages are realized in accordance with the present invention wherein sulfur is burned with commercial oxygen in several stages, the process involving the following steps:

(a) From about 5 to 40% of the total quantity of sulfur which is to be oxidized is burned without external cooling with not more than the stoichiometric quantity of oxygen required for its complete combustion and with the addition of from about 1 to 2 times its molar quantity of sulfur dioxide recycled at a temperature of from about 50° C. to 100° C., the temperature in this stage being maintained at from about 1500° to 2000 C.;

(b) The resulting hot combustion gases are cooled to a temperature of from about 800 C. to 1000° C.;

(c) The remaining sulfur, together with the cooled combustion gases which may contain unburned sulfur vapor, and the stoichiometric quantity of oxygen are reacted with indirect cooling in a plurality of serially arranged adjacent stages, the temperatures in the individual stages being maintained at from about 1700° C. to 2500° C., and the hot combustion gases being cooled after the reaction in each combustion stage to a temperature of from about 800° C. to 1000° C.

It has been found that stable combustion of sulfur with commercial oxygen can be ensured even at varying rates of output if from about 5 to 40 percent of the sulfur which is to be burned is burned in a first stage without cooling and the remainder is burned in subsequent stages with cooling. In computing the 1 to 2 moles of sulfur dioxide recycled to the uncooled first stage per mole of sulfur supplied thereto, the molecular weight of the sulfur is assumbed to be 32.

In the stoichiometric combustion of sulfur with oxygen, the calculated combustion temperature when the reactants ($SO_2$, $SO$, $S_2$, $S$ and $O_2$) are in equilibrium, taking into account dissociation processes, is about 3000° C.

According to the invention, the temperature of about 3000° C. which occurs in the combustion of sulfur with oxygen can be reduced to the permissible level, which is about 2000° C., depending on the nature of the materials used, by adopting the following measures:

1. Recycling of $SO_2$ to the first stage of combustion; and
2. Combustion of sulfur with a subequivalent amount of oxygen coupled with return of $SO_2$ to the first stage of combustion.

According to the invention, only from about 5 to 40% of the total quantity of sulfur is burned in the first stage of combustion, in the primary combustion chamber, with the addition of temperature lowering substances. The primary combustion chamber is preferably not divided into substages. The hot gas leaving the primary combustion chamber is cooled to temperatures of from about 800° C. to 1000° C. and conducted into indirectly cooled combustion stages arranged in series with simultaneous stepwise addition of additional sulfur and oxygen and combustion of the sulfur with the stoichiometric quantity of oxygen. In principle, the hot gas leaving the primary combustion chamber and cooled to temperatures of from about 800 to 1000° C. and the quantity of sulfur remaining could be burned stoichiometrically in one adjacent combustion stage with indirect cooling in accordance with the invention, but for technical purposes it is preferred in accordance with the invention to carry out subsequent combustion in from 2 to 4 adjacent spatially seperated combustion stages. The remaining 95 to 60% by weight of the total sulfur fed into the process undergo combustion in these cooled combustion stages, the heat of reaction being removed by indirect cooling. This stepwise combustion with cooling is advantageously carried out in a single combustion chamber system, hereinafter referred to as the secondary combustion chamber system. The maximum reaction temperature occurring in the individual stages of this combustion chamber system is about 2500° C. After combustion in the last combustion stage, the heat of reaction and tangible heat are removed by indirect cooling to such an extent that the temperature at the gas outlet is from about 200 to 600° C., depending on the purpose for which the $SO_2$ is to be used and the selected pressure stage of the cooling system.

The process according to the invention will now be described in more detail with reference to the accompanying drawing which is a flow sheet of the process and in which the reference numerals have the following meanings:

1 Primary combustion chamber,
2 Sulfur store,
3 Sulfur inlet,
4 Oxygen supply,
5 Oxygen inlet,
6 Compressor,
7 Sulfur dioxide return conduit,
8 Secondary combustion chamber system,
9 Combustion stages,
10 First cooling zone,
11 Sulfur injection device,
12 Oxygen injection device,
13 Cooling zones,
14 Final cooling zone,
15 Cooling stage,
16 Cooling stage,
17 Pure sulfur dioxide.

Referring to the drawing in detail, the reference numeral 1 represents a brick-lined sulfur combustion furnace which is capable of withstanding combustion temperatures of up to about 2000° C. In this furnace, the primary combustion chamber, from 5 to 40 percent of the total quantity of sulfur fed in at 3 from pipe 2 are burned with not more than the stoichiometric quantity of oxygen fed in at 5 from pipe 4. Sulfur dioxide is introduced into the primary combustion chamber by way of the compressor 6 and the conduit 7 for the purpose of lowering the combustion temperature. The combustion gas issuing from the hot ignition chamber, which may be laden with sulfur vapor, is conducted into an indirectly cooled secondary combustion chamber system 8, which is represented in the drawing as having three combustion stages 9 and which is preferably in the form of a pipe wall vessel. In this vessel, the gas is first cooled to temperatures of from about 800° C. to 1000° C. in a first cooling zone 10. The remainder of the sulfur which is to be oxidized is added to this precooled gas, in various combustion stages 9 which are arranged in series, by injection from the inlets 11 and undergoes stoichiometric combustion with oxygen introduced through inlets 12. The resulting hot combustion gases, which may have temperatures of up to 2500° C., are cooled to temperatures of from about 800° C. to 1000° C. in cooling zones 13, which follow each combustion stage 9. After passing through the final combustion stage and subsequent indirect cooling to temperatures of from about 200° to 600° C. in the final cooling zone 14, they are further cooled in cooling stages 15 and 16 and condensed to give pure $SO_2$ 17. Before the sulfur dioxide is condensed, it is piped off at temperatures of about 50° C. to 100° C. through conduit 7 to be returned to the primary combustion chamber.

The amount of $SO_2$ returned to the primary combustion chamber is not an excessive load on production because only from 5 to 40% of the total quantity of sulfur undergo combustion in that chamber. The returned sulfur dioxide is preferably at a temperature of from about 50° C. to 100° C. but may be at higher or lower temperatures. At higher temperatures, the quantity of sulfur dioxide added is increased accordingly. If at the same time combustion is carried out with less than the stoichiometric quantity of oxygen, the amount of sulfur vapor being fed into the first cooling zone may be advantageously adjusted, in dependence on the selected pressure stage of the steam system and hence of the pipe wall temperature, so that condensation of sulfur on the pipe wall in the indirectly cooled secondary combustion chamber system is prevented. Thus, for example if the pipe wall temperature is 250° C., the maximum permissible load of sulfur before condensation occurs is 180 g./Nm.³, whereas with a pipe wall temperature of 280° C. the amount is 450 g./Nm.³ The pressures corresponding to these temperatures can be found from the vapor pressure curve of water. The lowering of temperature which occurs in the primary combustion chamber when combustion is carried out with a less than stoichiometric quantity of oxygen is due to the amount of heat of combustion used up as the energy of evaporation and disproportionation position required to convert liquid $S_8$ molecules introduced into the chamber into gaseous $S_2$ molecules.

In the cooled secondary combustion chamber system, stoichiometric quantities of sulfur and oxygen are introduced in graded amounts into the individual series-arranged combustion stages so that the heat flow in the individual stages never exceeds $q=10^6$ Kcal./m.²h. The rate of evaporation in the pipe wall vessel is thus in the region associated with intensive evaporation and bubble formation, so that conventional pipe wall vessels may be used. The heat of reaction is transferred to a cooling medium. Steam is a suitable cooling medium for this purpose. The exchanger surfaces are constructed as evaporators in those parts of the apparatus where unoxidized sulfur vapor still occurs, as in the first cooling zone. In those parts situated where the combustion of sulfur has already been completed, superheater surfaces may be provided for cooling the sulfur dioxide. To remove large quantities of heat with a high rate of heat transfer per unit area, the principle of "evaporation in supercooled liquids (evaporation cooling)" may be employed, in which case even larger quantities of heat can be tolerated. Owing to the higher rate of heat transfer per unit area and the lower gas volume, vessels with much smaller surfaces may be used than those required for the combustion of sulfur with air.

To give liquid $SO_2$, the $SO_2$ gas downstream of the cooling vessel may be cooled stepwise from a temperature of about 400° C. to the condensation temperature of −12° C. (in the absence of any inert gas) if the application of pressure is avoided. Cooling may be carried out in known manner by heating tank feed water or by methods of air and water cooling or by means of freezing mixtures.

The control of the reaction temperatures to about 1700° C. to 2500° C. in accordance with the invention ensures complete combustion of sulfur with the stoichiometric quantity of oxygen without any risk of leakage of sulfur vapors but at the same time enables conventional materials to be used for the combustion chambers.

Other very important advantages are the absence of nitrogen as gas ballast and energy ballast and the absence of nitrogen oxides as impurities in the sulfur dioxide.

The quantities of gas produced in the process described here, even with maximum recycle of sulfur dioxide, are only about one third of those formed in the stoichiometric combustion of sulfur with air.

The process according to the invention for the production of liquid sulfur dioxide can easily be combined with a process for the conversion of sulfur dioxide to sulfur trioxide by the contact method. In that case, the hot sulfur dioxide is cooled to suitable temperatures for the contact process.

The process according to the invention will now be explained more fully with the aid of the following example.

EXAMPLE

An atomization burner arranged at the end face of a brick-lined horizontal combustion furnace is fed with 415 kg./h. of elementary sulfur (20% of the total quantity) in liquid form together with 218 m.³/h. of oxygen and 361 Nm.³/h. or recycled gaseous sulfur dioxide. The combustion product comprises 579 Nm.³/h. of $SO_2$ and 73 Nm.³/h. of excess sulfur in the form of vapor.

The sulfur vapor excess corresponds to a charge of 180 g. S/Nm.³ $SO_2$.

The combustion temperature in the sulfur combustion furnaces lined with conventional brick materials is about 1800° C.

The gas leaving the sulfur combustion furnaces at about 1800° C. is conducted into a waste heat boiler directly flanged to the sulfur combustion furnace. The waste heat boiler is in the form of a pipe wall construction (pipe to pipe welded gas-tightly) and connected to a 30 atmospheres steam system, the pipe wall arranged to function as evaporator surface.

In a first cooling zone of the pipe wall vessel, the gas from the sulfur combustion furnace is cooled from about 1800° C. to about 1000° C. before sulfur and oxygen are added in a following combustion stage.

The remaining sulfur which is still to be burned and which amounts to about 80% of the total quantity of sulfur put into the process, is introduced into the process and is burned with oxygen in three stages of the cooled secondary combustion chamber system. Sulfur and oxygen are fed into the individual stages in the following proportions:

1st feed: 625 kg. of S/h., 510 Nm.³ of $O_2$/h. This quantity of oxygen also includes the quantity of oxygen required for the subsequent stoichiometric combustion of the excess sulfur vapor from the primary combustion stage. 2nd feed: 520 kg. of S/h., 364 Nm.³ of $O_2$/h. 3rd feed: 520 kg. of S/h., 364 Nm.³ $O_2$/h.

The sulfur and oxygen are supplied from cooled atomization burners installed in the axis of the pipe wall vessel and connected to the cooling system of the pipe wall.

Between the feed points there are cooling zones in each of which the gas is cooled to about 1000° C. After the final combustion stage, the $SO_2$ gas is cooled to about 400° C., the heat removed being used for superheating steam.

$SO_2$ gas leaving the pipe wall vessel at a temperature of about 400° C. ($V=1817$ Nm.³$/h$.) is cooled to 60° C. in its passage through a tank feed water preheater and a water cooler. 361 Nm.³/h. (20%) of the 1817 Nm.³ of $SO_2$/h. are recycled to the brick-lined primary combustion chamber by way of a compressor, for the purpose of controlling the combustion temperature.

1455 Nm.³ of $SO_2$/h. are condensed in an $NH_3$ evaporator and discharged as product.

It will be appreciated that the instant specification and examples are set forth by way of illustration and not limitation and that various modifications and changes may be made without departing from the spirit and scope of the present invention.

What is claimed is:

1. In the combustion of sulfur with oxygen in several stages to produce sulfur dioxide, the improvement which comprises:
   (a) in a first stage, mixing from about 5 to 40 percent of the total quantity of sulfur to be burned with from about 1 to 2 times its molar amount of sulfur dioxide recycled at a temperature of from about 50° C. to 100° C., and burning the sulfur without external cooling with at most the quantity of oxygen required for complete stoichiometric combustion, the temperature in this stage being kept at from about 1700° C. to 2000° C.;
   (b) cooling the resulting hot combustion gases to a temperature of from about 800° C. to 1000° C.; and
   (c) burning the remaining quantity of sulfur to be burned, admixed with the cooled combustion gases, with the stoichiometric quantity of oxygen in a plurality of serially arranged adjacent stages wherein the temperature is maintained at from about 1700° C. to 2500° C., the hot combustion gases being cooled to a temperature of about 800° C. to 1000° C. after the reaction in each combustion stage.

2. The process of claim 1, wherein the combustion of step (c) is effected in from 2 to 4 stages with indirect cooling of the combustion gases in each stage.

3. The process of claim 1, wherein the amount of oxygen supplied in step (a) is less than the stoichiometric quantity so that some uncombusted sulfur vapor is mixed with the combustion gases of step (a).

4. The process of claim 2, in which sulfur and oxygen are fed into the individual indirectly cooled combustion stages at such rate that the heat flow does not exceed $q=10^6$ kcal./m.²h.

5. The process of claim 2, in which the maximum sulfur vapor charge at the inlet into the indirectly cooled stages is selected according to the pipe wall temperature of the cooled stages so as to avoid condensation of sulfur on said pipe wall.

6. The process of claim 4, in which the maximum sulfur vapor charged at the inlet into the indirectly cooled stages ranges from about 180 g. of S/Nm.³ when the pipe wall temperature is 250° C. to 450 g. of S/Nm.³ when the pipe wall temperature is 280° C.

References Cited

UNITED STATES PATENTS

| 1,863,705 | 6/1933 | Weinberg | 423—543 |
| 1,566,538 | 12/1925 | Howard | 23—278 |
| 996,215 | 6/1911 | Contamin | 23—278 |

FOREIGN PATENTS

| 497,646 | 11/1953 | Canada | 425—543 |

OSCAR R. VERTIZ, Primary Examiner

G. P. STRAUB, Assistant Examiner

U.S. Cl. X.R.

423—532, 539; 23—278